2,905,637

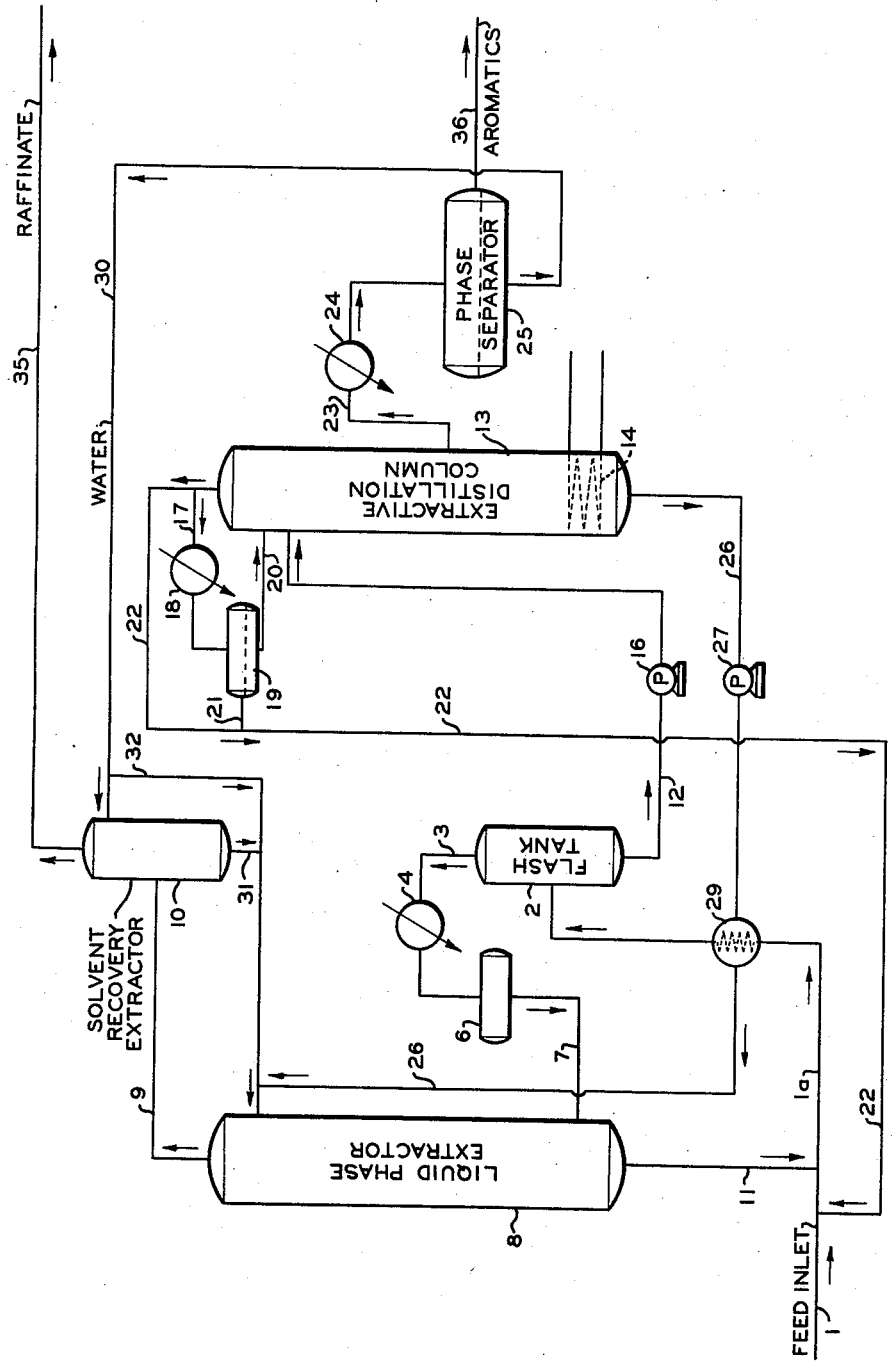

COMBINED LIQUID-VAPOR PHASE SEPARATION PROCESS

Raymond C. Scofield and John A. Weedman, Bartlesville, Okla., assignors to Phillips Petroleum Company, a corporation of Delaware Application June 13, 1955, Serial No. 514,885

11 Claims. (Cl. 208—311)

This invention is directed to an improved process for separating mixtures of hydrocarbons. More specifically, the invention is directed to a hydrocarbon separation process wherein at least two components of the mixture to be separated have different degrees of solubility in a selective solvent.

The invention is particularly useful in the separation of such mixtures of hydrocarbons in which at least two of the components having different degrees of solubility in a selective solvent are also relatively close-boiling and therefore are difficult to separate by ordinary fractional distillation.

The need for separation of hydrocarbons of different molecular type arises constantly in the petrochemical industry. Because of the close similarity in physical properties of many of these compounds, it has been very difficult to separate them according to their chemical types. Liquid phase extraction of these mixtures with selective solvents constitutes one known method of separating them according to molecular type. Another known method is vapor phase extraction, sometimes called extractive distillation. Combinations of the two are sometimes used, as shown, for example, by U.S. 2,407,820.

In a system comprising aromatics, naphthenes, and paraffins, the aromatics can be selectively absorbed from the naphthenes and paraffins by a suitable solvent. Likewise, paraffins may be recovered from either or both of the other components. Also, naphthenes may be recovered from admixture with either of the other components. The present invention will be described in detail with respect to an aromatic-paraffin system but it should be understood that it is equally applicable to any of the above suggested separations.

In hydrocarbon mixtures having a relatively narrow boiling range, solvent selectivity is primarily a function of the carbon-hydrogen ratio. For example, hydrocarbons are selectively absorbed in most solvents in the order of aromatics, naphthenes, and paraffins. The present invention is in separating into at least two fractions a mixture of the type just mentioned by a combination of liquid phase and vapor phase separation wherein the same solvent is used in three different separation steps and wherein only a fraction of the feed passes through the solvent extraction column. This permits using less solvent, thereby economizing over conventional separations of this type.

Accordingly, an object of the present invention is to provide an effective and improved process of separating a mixture of hydrocarbons according to their differing degrees of solubility in a given solvent. Another object is to provide such a process employing a combination of both liquid phase and vapor phase separation. A further object is to provide a means of operating said combination process using a minimum of solvent and separation facilities.

As applied, e.g., to the separation of aromatics and paraffins, the process involves flashing the feed in the presence of the solvent to make a preliminary separation of the raffinate and extract products, feeding the paraffin-rich overhead from the flash to an extraction column wherein it is extracted with a solvent selective for aromatics, the paraffins being withdrawn as raffinate, passing the aromatic-rich extract phase into the feed to the flash chamber, processing the bottoms from the flash chamber in a vapor phase extraction column from which substantially all the remaining paraffins are removed as overhead, recycling at least a portion of this overhead to the flash vessel, the remainder, if any, serving as reflux for the column, taking off a side stream of aromatics from the column, and withdrawing the denuded solvent as kettle product and recycling it to the extraction unit.

Referring to the drawing and again for illustrative purposes to a feedstock containing aromatics and paraffins, the feed is admitted to the system through line 1, a recycle stream and an extract phase added thereto through lines 22 and 11, respectively, and the combined stream, which may be a mixture of vapor and liquid, is passed through heat-exchanger 29 and injected through line 1a into flash chamber 2. The flashed overhead, a paraffin-rich fraction, is withdrawn as vapor via line 3 to condenser 4 and accumulator 6 from which it passes through line 7 to liquid phase extractor 8. In vessel 8 the paraffinic fraction is passed countercurrently through a descending column of selective solvent for aromatics, such as an aqueous diethylene glycol solution, admitted to the top of extractor 8 through line 26. Paraffinic raffinate is withdrawn overhead through line 9, water-washed (optional) in solvent recovery extractor 10, and passed via line 35 to suitable raffinate separation and storage means, not shown. From the base of extractor 8 the extract phase comprising solvent substantially free of paraffins but containing dissolved aromatics is returned via line 11 to line 1 for reflashing as indicated.

The bottoms from flash chamber 2 is pumped by pump 16 through line 12 to an extractive distillation vessel or stripper 13 equipped with reboiler 14. Stream 12 is preferably introduced above the top tray but may be introduced intermediate the ends of the contacting section. Overhead from stripper 13 containing essentially all the paraffins from the aromatics-rich fraction, together with some aromatics, may be passed via line 17 to condenser 18 to effect condensation of the vapor. The condensate which is enriched in high boiling components is collected in accumulator 19 and returned through line 20 to stripper 13 as reflux, and the uncondensed vapor is passed from accumulator 19 via line 21 for recycle to feed inlet line 1. Where reflux to column 13 is unnecessary, the overhead in line 17 is admitted directly to line 22. A vapor side stream containing the aromatics and some water is withdrawn through line 23 to condenser 24 and phase separator 25, wherein the water accumulates as a lower layer, the aromatics passing via line 36 to suitable recovery means. The solvent, substantially free of dissolved aromatics and paraffins, is withdrawn as bottoms from the base of stripper 13 and recycled through line 26, pump 27, heat exchanger 29 (wherein it imparts some of the kettle heat to the feedstock in line 1) and to the top of liquid phase extractor 8. Inasmuch as the heat transferred in exchanger 29 is still insufficient to cool the recycle solvent to the desired temperature of extractor 8, auxiliary cooling means may be provided in line 26. The water collected in phase separator 25 is recycled through line 30 to solvent recovery extractor 10 wherein it extracts solvent from the raffinate and returns it through lines 31 and 26 to extractor 8. The recycle water can bypass extractor 10 through line 32 in case the carryover of solvent in raffinate line 9 is negligible.

In conventional processes for the separation of hydrocarbons by means of selective solvents the entire feed stream is passed through a liquid phase extraction tower which comprises an upper extraction section and a lower refluxing section. Since in the present invention only a portion of the feed is subjected to liquid phase extraction, the extraction column 8 can be of relatively small capacity. Furthermore, since it is operated without the conventional refluxing section, it is substantially reduced in height, as compared with a conventional column.

The following table presents a material balance for a specific embodiment of the foregoing process. As shown in the left hand column, the feedstock consists of hexane, heptane, benzene, and toluene; the solvent is diethylene glycol and water. The numbers in the top row refer to the correspondingly numbered flow lines in the drawing. The numbers in the remaining rows are in terms of moles/hr. of material.

Table I

|  | 1 | 26 | 35 | 7 | 1a | 12 | 30 | 36 |
|---|---|---|---|---|---|---|---|---|
| Hexane | 325 |  | 325 | 445 | 602 | 157 |  |  |
| Heptane | 148 |  | 147 | 187 | 297 | 110 |  | 1 |
| Benzene | 68 |  | 3 | 44 | 128 | 84 |  | 65 |
| Toluene | 185 |  | 15 | 51 | 244 | 193 |  | 170 |
| Water |  | 1,920 |  | 77 | 2,297 | 2,220 | 200 |  |
| Diethylene glycol |  | 7,093 |  |  | 7,093 | 7,093 |  |  |
| Total | 726 | 9,013 | 490 | 804 | 10,661 | 9,857 | 200 | 236 |

In this particular example the temperature was 180° F. in the extractor 8 and in the flash vessel 2. The pressure in the flash vessel was 14.8 p.s.i.a and in the extractive distillation column 13 was 15.0 p.s.i.a. The temperature of the recycled solvent in line 26 was 298° F. Note that the aromatics content of the feedstock (column #1) was about 35% (68 mols benzene+185 moles toluene in 716 moles total feedstock) whereas the aromatics content of the flash vessel bottoms (column #12), exclusive of solvent, is about 52% (84 mols benzene+193 mols toluene in a mixture of 157 mols hexane+110 mols heptane). This shows that flash vessel 2 appreciably raises the contration of aromatics in the feed to extractive distillation column 13.

Within the general classes of paraffins and non-paraffins separable according to the method of this invention a number of subclasses could be enumerated. One of these is the separation of aromatics from paraffins, the aromatics being exemplified by benzene, toluene, and xylene. Another separation is that between naphthenes and paraffins, the naphthenes including cyclohexane, methyl cyclohexane, dimethyl cyclohexane, cyclopentane, methyl- and dimethyl cyclopentane, etc. Typical of the more common paraffins encountered in this process are hexane, heptane, and octane, along with their homologs. It is also possible by this method to separate aromatics from naphthene-paraffin fractions, the latter forming the raffinate and the aromatics the extract. Alternatively, a paraffinic fraction can be separated from an aromatic-naphthenic fraction, the latter forming the extract phase.

The organic solvents used in the process are those having greater solvent power for cyclic organic compounds than for paraffins. For reasons to be stated below, it is necessary that the solvent be water-soluble so that it can be recovered from the raffinate by water washing. Among the preferred solvents are high boiling hydroxy ethers, such as di-, tri-, and tetra-ethylene glycol. High boiling hydroxy esters, illustrated by diacetin, dibutyl tartrate, butyl lactate, are also suitable. Other solvents include tricresylphosphate, dibutyl phthalate, resorcinol, phenol, triethylene tetramine, anisidine, acetamide, triacetin, xylidine, acetanilide, diethanolamine, nitrobenzene, aniline, "Chlorex," diaminopropanol, benzaldehyde, triethanolamine, eugenol, diphenyl amine, acetophenone, xylenol, "Carbitol" acetate, butyl Carbitol, methyl Carbitol, and phenetidine.

The function of the water in this system is primarily to lower the solubility of the organic solvent in the raffinate so as to prevent loss of solvent at this point. A solvent like triethylene glycol, for example, has an appreciable solubility in the paraffinic raffinate so would tend to be carried over with it. The addition of water to such a solvent lowers its solubility in the raffinate in proportion to the percentage of water in the water-solvent solution. In this way the raffinate is kept essentially solvent-free. The presence of the water also contributes to increased selectivity, that is, a given amount of solvent effects a sharper separation between the extract and raffinate when water is present. Stated another way, the best selectivity is obtained where solubility of one component is at its minimum.

The amount of water used with the solvent is preferably 5–10 percent by weight of the water-solvent solution, although this percentage can vary from 1–20.

Attention is called to the fact that a given quantity of solvent serves three functions. First, the solvent gives paraffins a high relative volatility in the flash step. Second, the same solvent is utilized to separate remaining paraffins from aromatics by extractive distillation. Third, the denuded solvent recovers aromatics from the paraffin-rich fraction by extraction. The main feature of the invention is the three-functional usage of solvent as described in the flow-sheet.

We claim:

1. A process for separating a mixture of hydrocarbons containing at least two components having different degrees of solubility in a given solvent comprising flashing said mixture in a flash zone in admixture with said solvent to produce an overhead vapor enriched in a less soluble component and a liquid stream comprising said solvent and a more soluble component of said hydrocarbon mixture; condensing said overhead vapor to form a condensate; extracting said condensate with said solvent to produce a raffinate phase comprising said less soluble component; passing said liquid stream to an extractive distillation zone and therein separating said liquid stream into a first stream comprising said less soluble component, and a second stream comprising said more soluble component.

2. A process for separating a mixture of hydrocarbons containing at least two components having different degrees of solubility in a given solvent comprising flashing said mixture in a flash zone in admixture with said solvent to produce an overhead vapor enriched in a less soluble component and a liquid stream comprising said solvent and a more soluble component of said hydrocarbon mixture; condensing said overhead vapor to form a condensate; extracting said condensate with said solvent to produce a raffinate phase comprising said less soluble component; passing said liquid stream to an extractive distillation zone and therein separating said liquid stream into an overhead product comprising said less soluble component, a kettle product comprising said solvent, and a side stream comprising said more soluble component.

3. A process according to claim 2 wherein said mixture of hydrocarbons contains naphthenes and paraffins and the solvent is an aqueous solution of diethylene glycol, the paraffins being relatively insoluble in the solvent as compared to the naphthenes.

4. Process of claim 2 wherein said mixture of hydrocarbons contains aromatics and paraffins and the solvent is an aqueous solution of diethylene glycol, the paraffins being relatively insoluble in the solvent as compared to the aromatics.

5. A process for separating cyclic hydrocarbons selected from the group consisting of aromatics and naphthenes and paraffinic compounds from a feedstock mixture comprising flashing said feedstock admixed with a solvent selective for said cyclic hydrocarbons to make a rough separation of paraffins in the overhead and cyclic hydrocarbons in the solvent bottoms, condensing the overhead and extracting the condensate in a liquid phase extraction zone with a portion of said selective solvent to form a raffinate and an extract phase, said raffinate containing predominately paraffinic compounds and the extract phase comprising the selective solvent with cyclic hydrocarbons dissolved therein, separately withdrawing the raffinate and extract phases, returning the extract phase to the flash zone in admixture with said feedstock, the solvent portion of the extract rendering the paraffins relatively volatile in the flashing step as compared to the cyclic hydrocarbons, subjecting the bottoms from the flash zone to extractive distillation, said bottoms containing a major amount of solvent, withdrawing in vapor phase from the distillation zone an overhead stream and a side stream rich in cyclic hydrocarbons, recycling the overhead to the flash zone with the feedstock, withdrawing the denuded solvent as bottoms from the distillation zone, and returning it to the liquid phase extraction zone for further extraction of the cyclic hydrocarbons therein.

6. A process according to claim 5 wherein said cyclic hydrocarbons are aromatics.

7. A process according to claim 5 wherein said cyclic hydrocarbons are naphthenes.

8. A process according to claim 5 comprising separating water from said side stream and passing said water to said liquid phase extraction zone, thereby lowering the solubility of said raffinate in the solvent.

9. The process of claim 5 wherein the solvent is an aqueous solution of diethylene glycol containing 5–10 percent by weight of water.

10. Process of claim 5 wherein a portion of the overhead from the distillation zone is condensed, the condensate returned to the distillation zone as reflux, and the uncondensed portion recycled to the flash zone.

11. Process of claim 5 wherein water is separated from said side stream and used to strip entrained solvent from the paraffinic raffinate phase.

References Cited in the file of this patent
UNITED STATES PATENTS

| | | |
|---|---|---|
| 2,215,915 | Cope et al. | Sept. 24, 1940 |
| 2,459,403 | Ahrens | Jan. 18, 1949 |
| 2,727,848 | Georgian | Dec. 20, 1955 |
| 2,770,576 | Pratt | Nov. 13, 1956 |
| 2,773,918 | Stephens | Dec. 11, 1956 |
| 2,809,222 | Hawkins et al. | Oct. 8, 1957 |